(12) United States Patent
Huang et al.

(10) Patent No.: US 11,743,915 B2
(45) Date of Patent: Aug. 29, 2023

(54) REPORTING AND PRECODER SIGNALING IN SIDELINK RESOURCE ALLOCATION

(71) Applicant: QUALCOMM Incorporated, San Diego, CA (US)

(72) Inventors: Yi Huang, San Diego, CA (US); Wanshi Chen, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/386,313

(22) Filed: Jul. 27, 2021

(65) Prior Publication Data

US 2022/0104183 A1    Mar. 31, 2022

Related U.S. Application Data

(60) Provisional application No. 63/084,842, filed on Sep. 29, 2020.

(51) Int. Cl.
*H04W 72/10* (2009.01)
*H04W 24/10* (2009.01)
*H04W 72/23* (2023.01)

(52) U.S. Cl.
CPC ........... *H04W 72/23* (2023.01); *H04W 24/10* (2013.01)

(58) Field of Classification Search
CPC .............................. H04W 72/23; H04W 24/10
See application file for complete search history.

(56) References Cited

U.S. PATENT DOCUMENTS

| | | | |
|---|---|---|---|
| 2016/0072565 A1* | 3/2016 | Yu | H04B 7/0619 |
| 2022/0007227 A1* | 1/2022 | Zhao | H04L 5/0037 |
| 2022/0183017 A1* | 6/2022 | Wu | H04B 17/309 |

* cited by examiner

*Primary Examiner* — Ronald B Abelson
(74) *Attorney, Agent, or Firm* — Patterson + Sheridan, L.L.P.

(57) ABSTRACT

Aspects of the present disclosure provide apparatus, methods, processing systems, and computer readable mediums for providing two channel state information (CSI) reports based on sidelink CSI reference signal (RS) respectively to a sidelink user equipment (UE) and a network entity (e.g., a base station). Existing sidelink CSI reporting between UEs is not shared with the network. The lack of information on the network side prevents scheduling improvements. Therefore, by generating a second CSI report to the network, the network can have information to better schedule sidelink UE transmissions and to introduce precoding matrix indicator (PMI) signaling.

27 Claims, 14 Drawing Sheets

REPORTING AND PRECODER SIGNALING IN SIDELINK RESOURCE ALLOCATION

CROSS-REFERENCE TO RELATED APPLICATION

This application claims benefits of and priority to U.S. Provisional Patent Application No. 63/084,842, filed Sep. 29, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to device-to-device sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications generally refer to communications between devices (e.g., between UEs). As the demand for mobile broadband access continues to increase, the demand for improvements to sidelink communications increases as well.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communication by a reporting user equipment (UE). The method generally includes receiving a sidelink channel state information (CSI) reference signal (RS) from a requesting UE; generating a first CSI report based on the sidelink CSI RS to send to the requesting UE; and generating a second CSI report based on the sidelink CSI RS to send to a network entity.

Certain aspects of this disclosure provide a method for wireless communication by a requesting user equipment (UE). The method generally includes sending a sidelink channel state information (CSI) reference signal (RS) to a reporting UE; receiving, from the reporting UE via physical sidelink shared channel (PSSCH), a first CSI report based on the sidelink CSI RS; and receiving signaling from a network entity, for having the reporting UE carry a second CSI report to send to the network entity, based on the sidelink CSI RS.

Certain aspects provide means for, apparatus, and/or computer readable medium having computer executable code stored thereon, for techniques described herein for forming a virtual user equipment group and enhancing communication using joint reception and transmission mechanisms.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
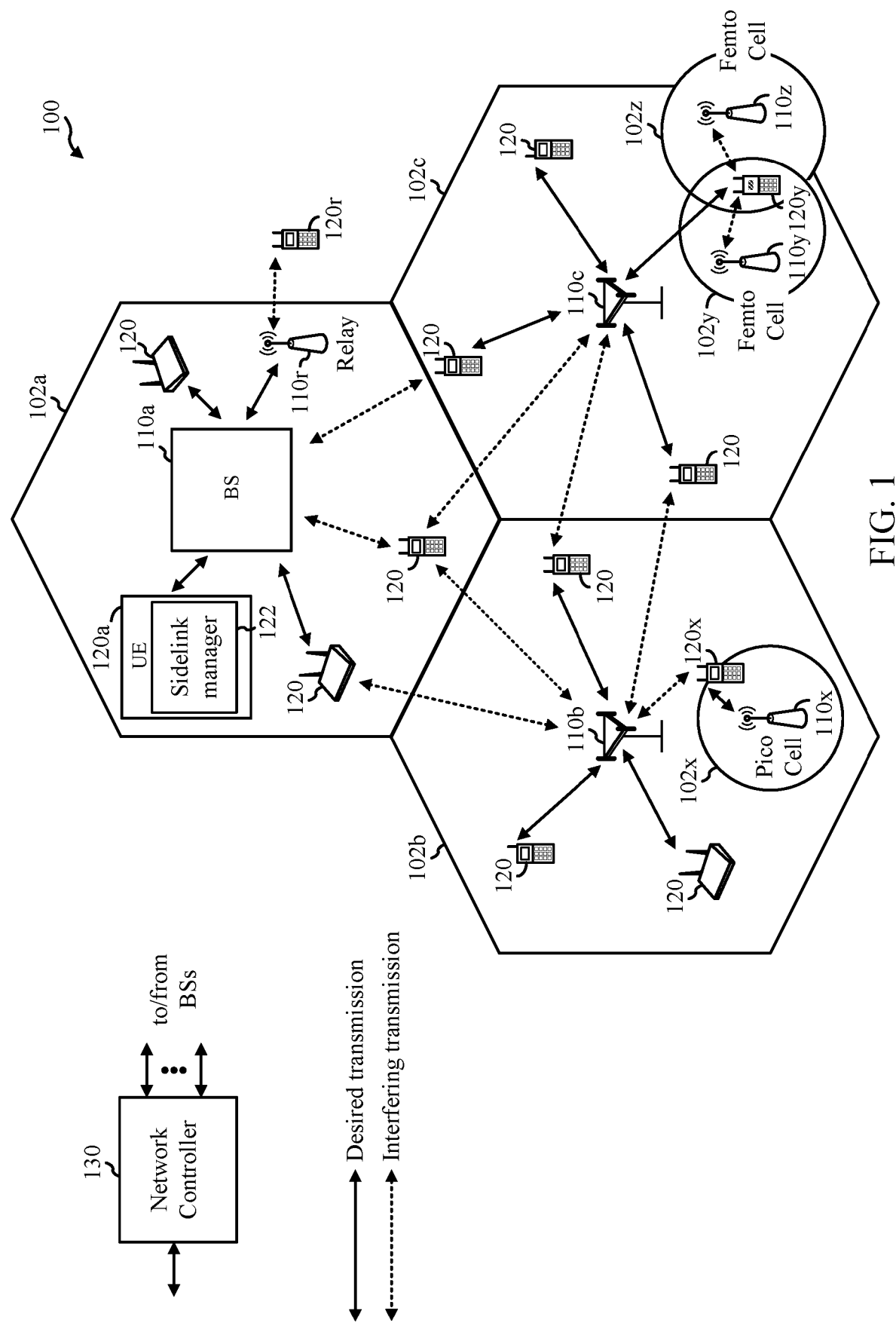
FIG. 1 is a block diagram conceptually illustrating an example telecommunications system, in accordance with certain aspects of the present disclosure.

Aspects of the present disclosure provide apparatus, methods, processing systems, and computer readable mediums for providing two channel state information (CSI) reports based on sidelink CSI reference signal (RS) respectively to a sidelink user equipment (UE) and a network entity (e.g., a base station). Existing sidelink CSI reporting between UEs is not shared with the network. The lack of information on the network side prevents scheduling improvements. Therefore, by generating a second CSI report to the network, the network can have information to better schedule sidelink UE transmissions in Mode 1 (discussed below). The information may also enable precoding matrix indicator (PMI) signaling in Mode 1.

In general aspects, a reporting UE is in sidelink communications with a requesting UE. The reporting UE receives a sidelink CSI RS from the requesting UE. In response, the reporting UE generates a first CSI report based on the sidelink CSI RS. The reporting UE then sends the first CSI report to the requesting UE. In addition, the reporting UE generates a second CSI report based on the sidelink CSI RS for sending to a network entity. In some aspects, the second CSI report contains more channel status information than the first CSI report and allows the network entity to better schedule sidelink transmissions.

The following description provides examples for the disclosed sidelink communications and improvements thereof, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. The wireless communication network 100 may include one or more UEs 120 as shown, which performs techniques described herein. For example, one or more UEs 120a of FIG. 1 may be configured to perform operations 1100 described below with reference to FIG. 11 to sense resources using SCI at a reduced and flexible occurrence frequency (i.e., at an extended time interval between repetitions).

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to determine resources to use for sidelink communications (with another UE). As shown in FIG. 1, the UE 120a includes a sidelink manager 122. The sidelink manager 122 may be configured to transmit a sidelink communication to another UE, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
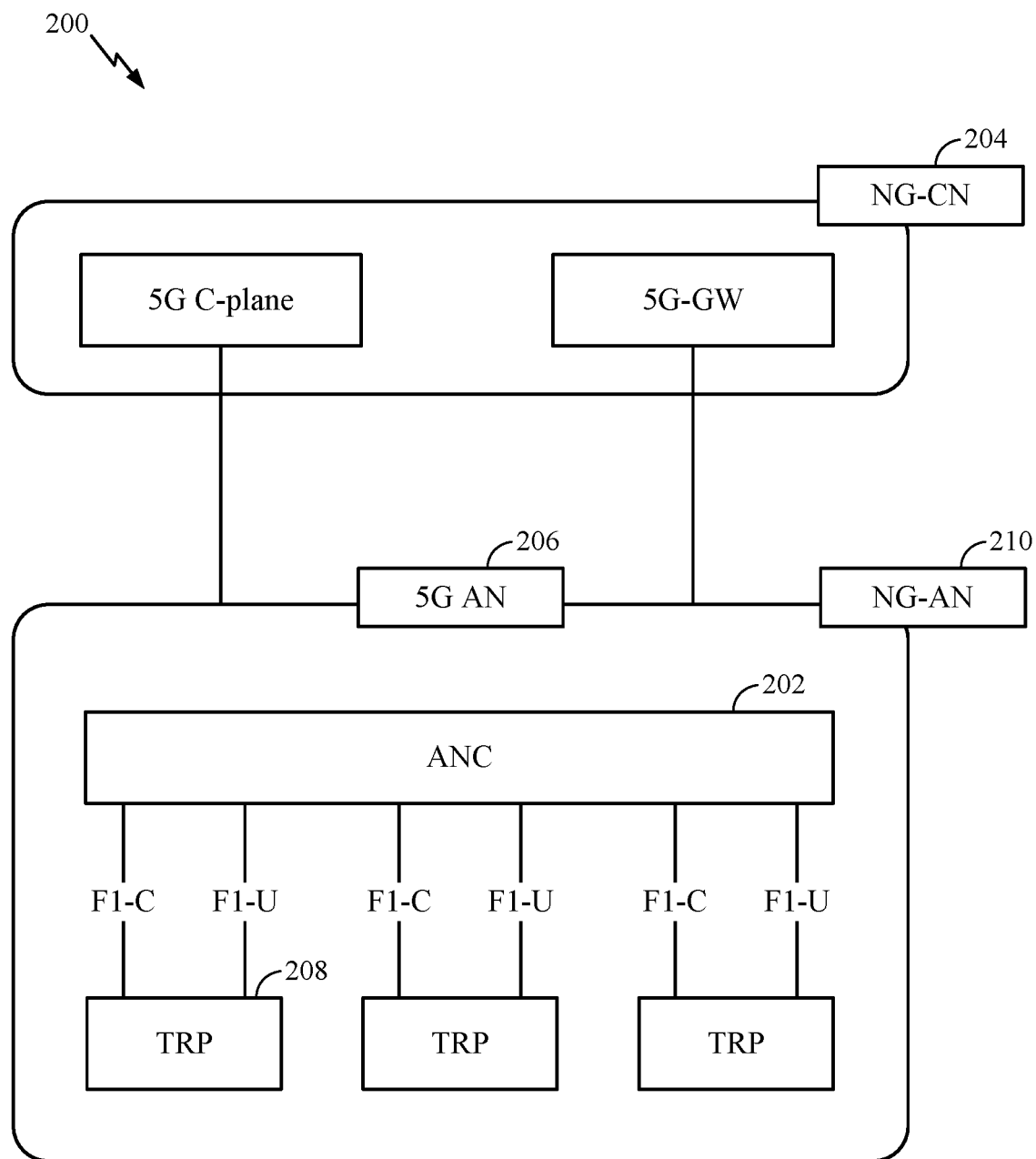
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
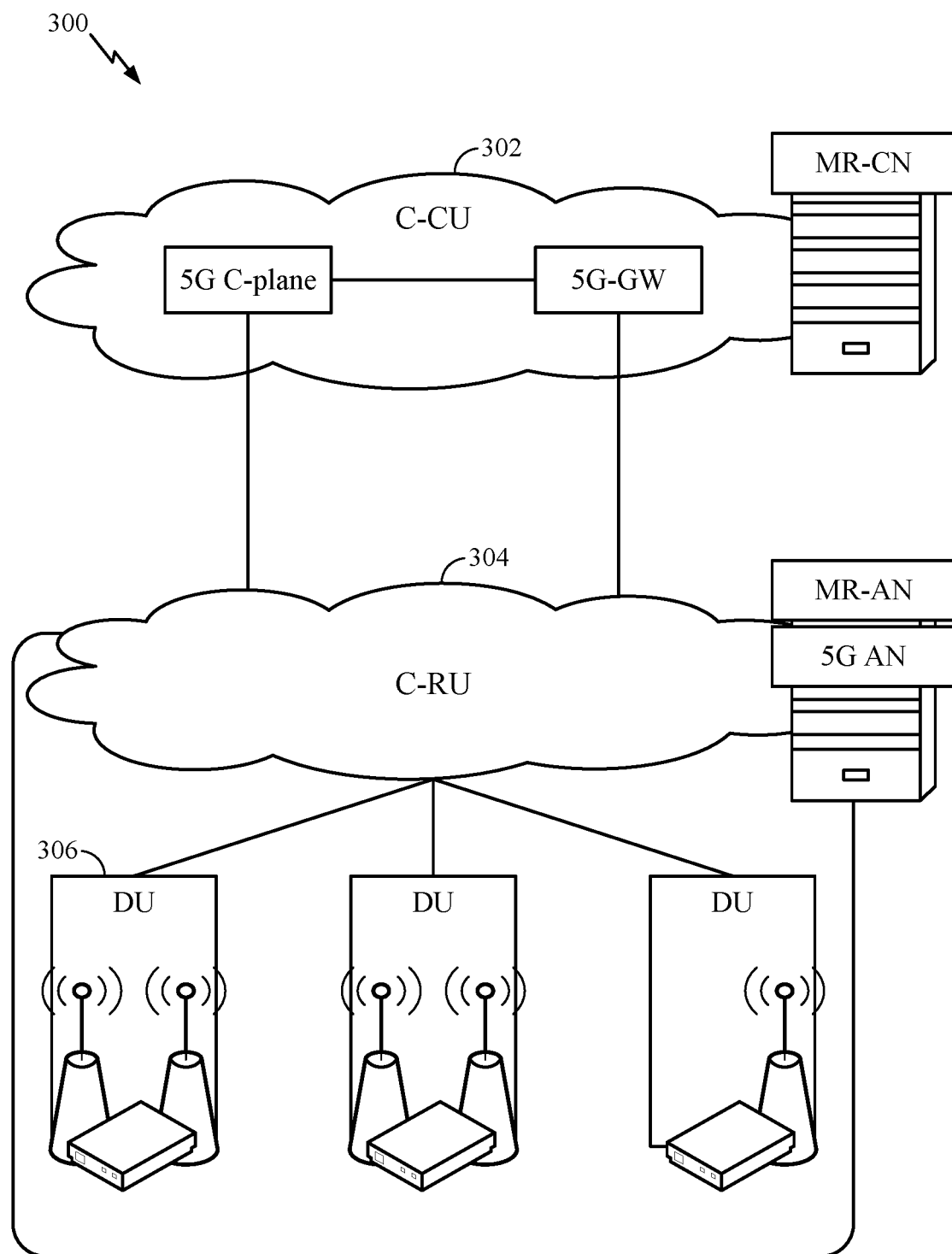
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
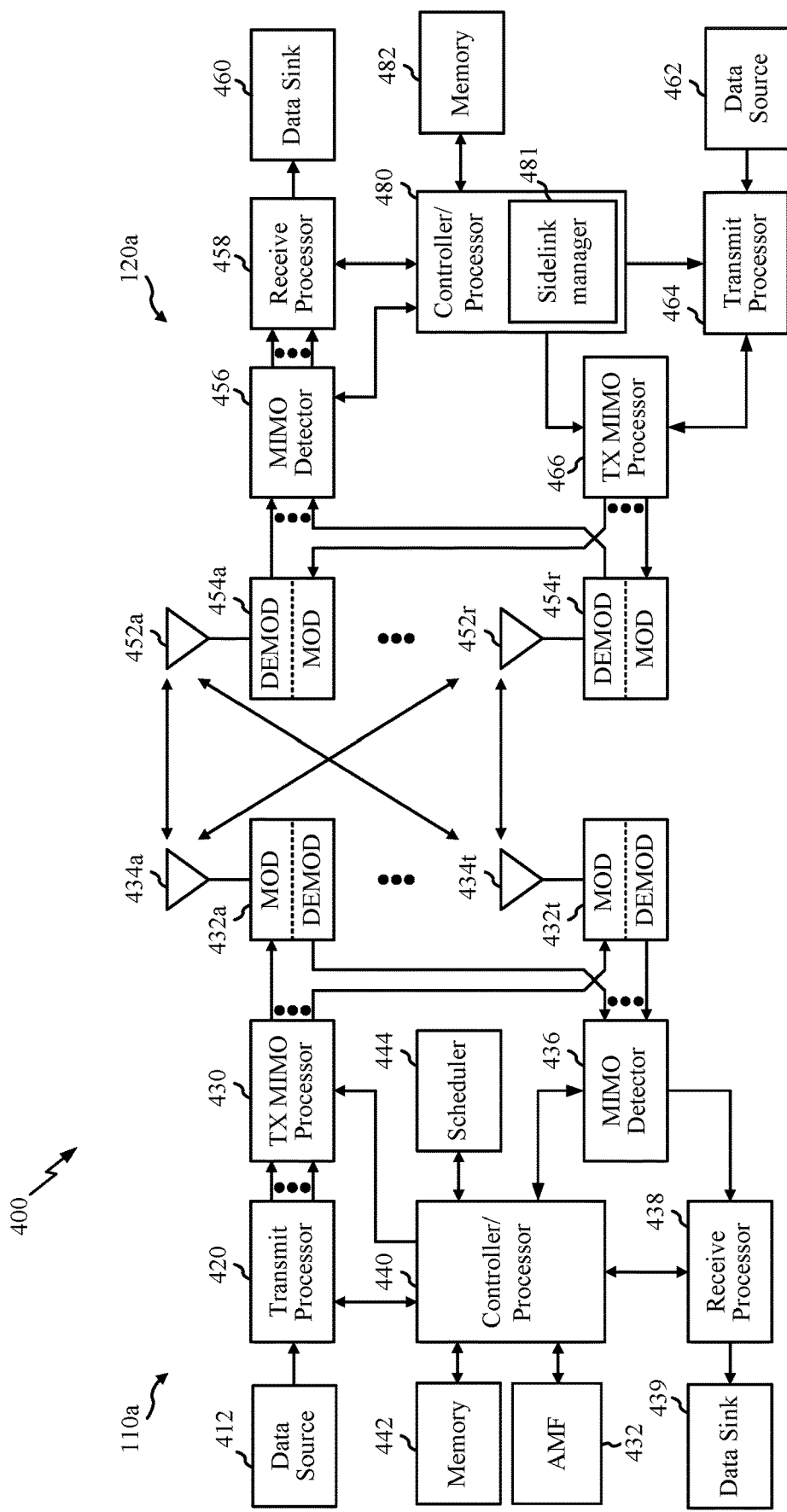
FIG. 4 is a block diagram conceptually illustrating a design of an example base station (BS) and user equipment (UE), in accordance with certain aspects of the present disclosure.

FIG. 4 illustrates a block diagram 400 including example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIGS. 10 and/or 11.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS).

A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120$a$ to a data sink 460, and provide decoded control information to a controller/processor 480.

On the uplink, at UE 120$a$, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454$a$ through 454$r$ (e.g., for SC-FDM, etc.), and transmitted to the base station 110$a$. At the BS 110$a$, the uplink signals from the UE 120$a$ may be received by the antennas 434, processed by the modulators 432, detected by a MIMO detector 436 if applicable, and further processed by a receive processor 438 to obtain decoded data and control information sent by the UE 120$a$. The receive processor 438 may provide the decoded data to a data sink 439 and the decoded control information to the controller/processor 440.

The controllers/processors 440 and 480 may direct the operation at the BS 110$a$ and the UE 120$a$, respectively. The processor 440 and/or other processors and modules at the BS 110$a$ may perform or direct the execution of processes for the techniques described herein. As shown in FIG. 4, the controller/processor 480 of the UE 120$a$ has a sidelink manager 481 that may be configured for transmitting a sidelink communication to another UE. Although shown at the controller/processor 480 and controller/processor 440, other components of the UE 120$a$ and BS 110$a$ may be used performing the operations described herein. The memories 442 and 482 may store data and program codes for BS 110$a$ and UE 120$a$, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
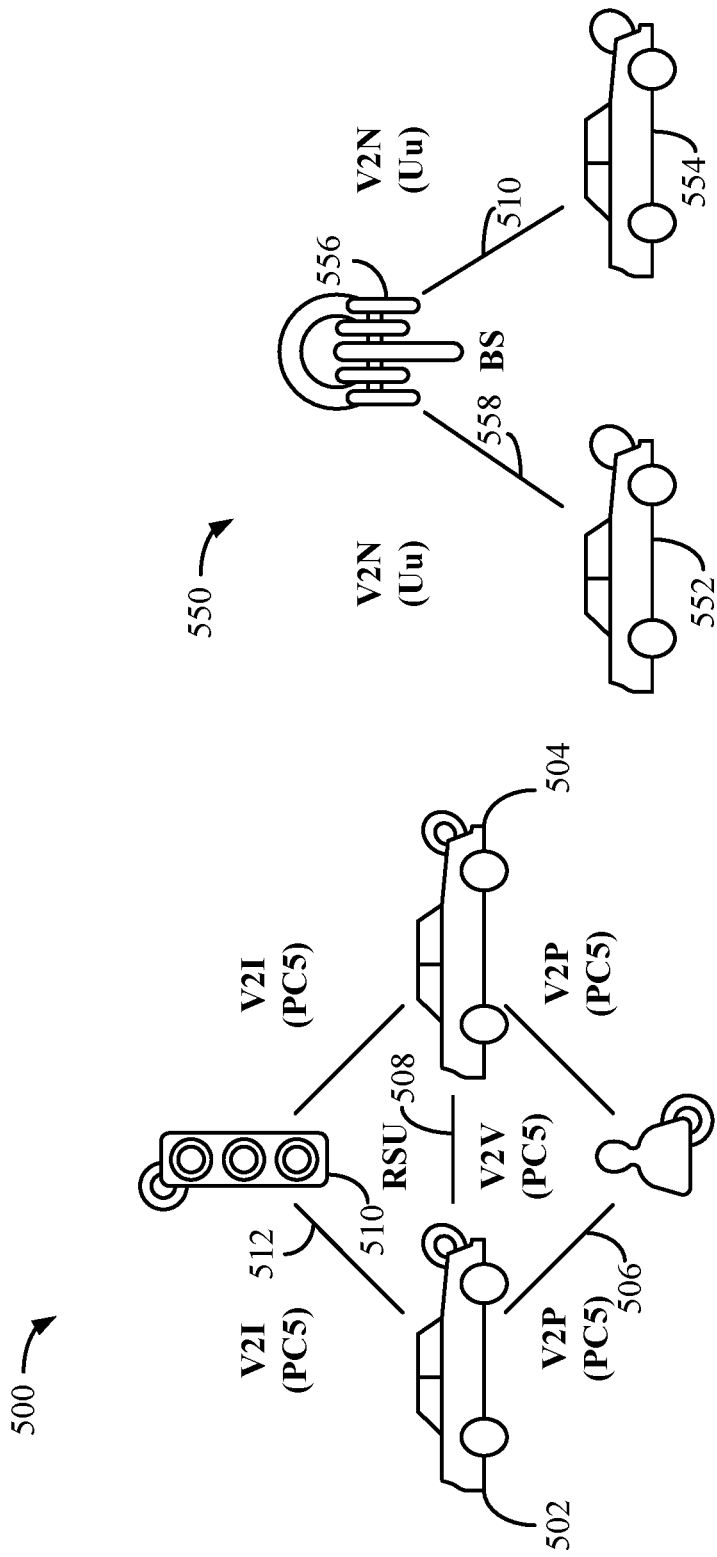
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512.

With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident at a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications.

Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
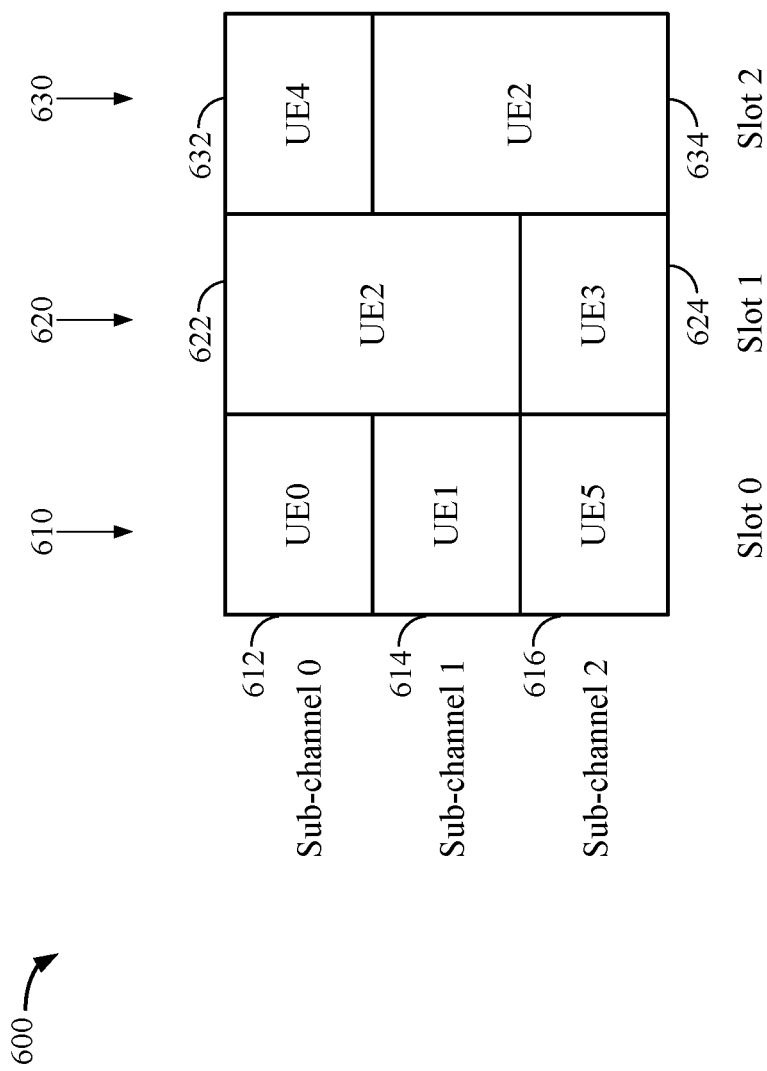
FIG. 6 illustrates an example allocation of a resource pool for sidelink communications, in accordance with certain aspects of the present disclosure.

FIG. 6 is an example of how resources of a common resource pool 600 may be allocated for sidelink communications (broadcast and groupcast device-to-device or D2D) between UEs (e.g., UEs 110, shown in FIG. 1). The common resource pool 600 includes slots 610, 620, and 630 and sub-channels 0, 1, and 2 corresponding to communications 612, 614, and 612.

As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2.

In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Example SL-CSI Report and Precoder Signaling in Sidelink Resource Allocation

Aspects of the present disclosure provide techniques that generates a first channel state information (CSI) report based on a sidelink CSI reference signal (RS) to send to a user equipment (UE) and a second CSI report based on the sidelink CSI RS to send to a network entity. For example, a requesting UE in sidelink connection with a reporting UE may request feedback (e.g., CSI in physical sidelink shared channel (PSSCH)).

Figure 8:
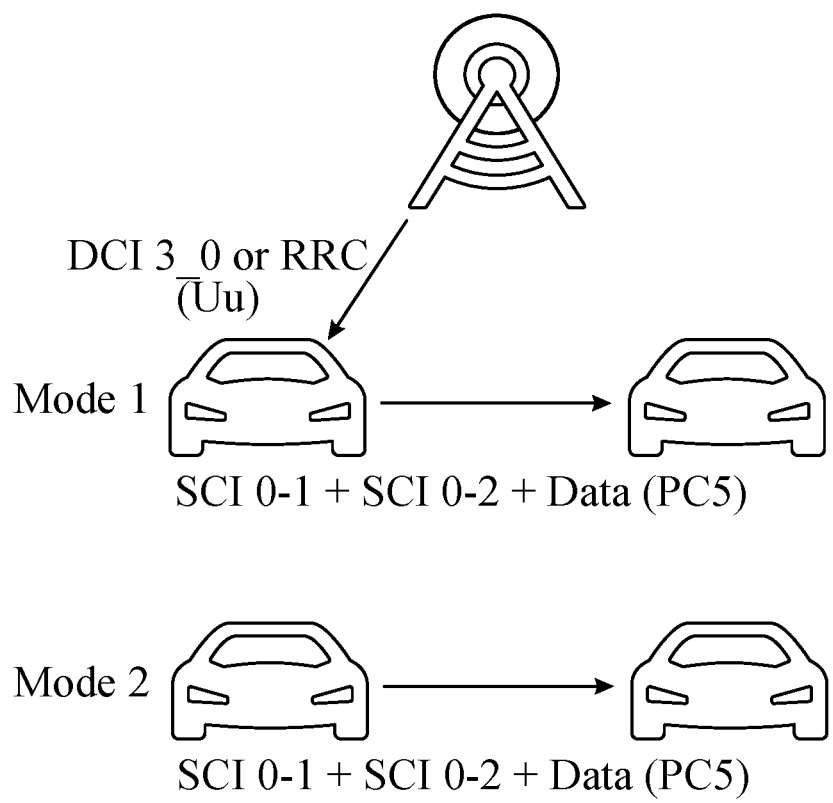
FIG. 8 illustrates two modes of sidelink communication.

In Mode 1 sidelink communication (as shown in FIG. 8) that involves a network entity, the network may utilize the sidelink CSI information to better schedule the sidelink UE transmissions in mode 1. As will be described in greater detail below, a reporting UE may receive a sidelink CSI RS from a requesting UE. The reporting UE may generate a first CSI report based on the sidelink CSI RS to send to the requesting UE. The reporting UE may generate a second CSI report based on the sidelink CSI RS to send to the network entity.

Figure 7:
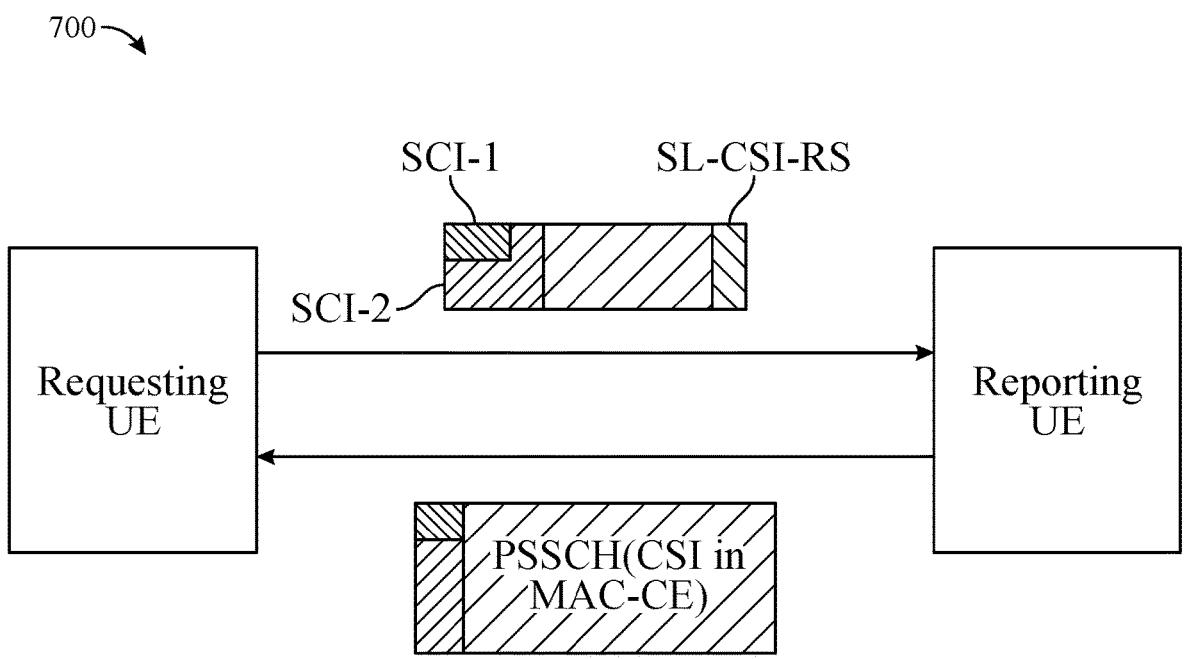
FIG. 7 is a diagram showing a requesting UE in sidelink communication with a reporting UE, in accordance with certain aspects of the present disclosure.

Turning to FIG. 7, an example diagram 700 shows a requesting UE in sidelink communication with a reporting UE, in accordance with certain aspects of the present disclosure. The transmission sent by the requesting UE may include the sidelink CSI RS at the end. The reporting UE sends PSSCH in return, which may include the CSI (report) in medium access control (MAC) control element (CE).

FIG. 8 illustrates two modes of sidelink communications (Mode 1 and Mode 2). The present disclosure concerns primarily with Mode 1. In Mode 1 sidelink communication, the sidelink resources are often scheduled by a gNB. In Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

In Mode 1, the gNB schedules sidelink (SL) resource(s) to be used by UE for SL transmission(s). Dynamic grants (DG), configured grants (CG) type 1, and CG type 2 are supported. CG type 1 is activated via radio resource control (RRC) signaling from gNB. DG and CG type 2 are conveyed using downlink control information (DCI) format 3_0 over physical downlink control channel (PDCCH), as shown in FIG. 9.

In some aspects, the DCI can be a DG and provide allocation to use over sidelink. The DCI can activate/deactivate a CG type 2 for sidelink. The UE reports activation/deactivation confirmation using MAC-CE. For example, the DCI format 3_0 may be used for scheduling of NR PSCCH and PSSCH in one cell. The DCI format 3_0 may include the following information: time gap, hybrid automatic repeat request (HARM) process ID, new data indicator, a lowest index of the subchannel allocation to the initial transmission.

In Mode 2, when traffic arrives at a reporting UE, the reporting UE may select resources for PSCCH and PSSCH, and/or reserve resources for retransmissions to minimize latency. Therefore, in conventional configurations the reporting UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate, as shown in FIG. 8, to use a subset of the resources. For example, in Mode 2, the UE may determine, (i.e., not scheduled by the gNB) sidelink transmission resource(s) within the sidelink resources configured by the gNB/network (or pre-configured sidelink resources), as further illustrated in FIG. 8.

Figure 9:
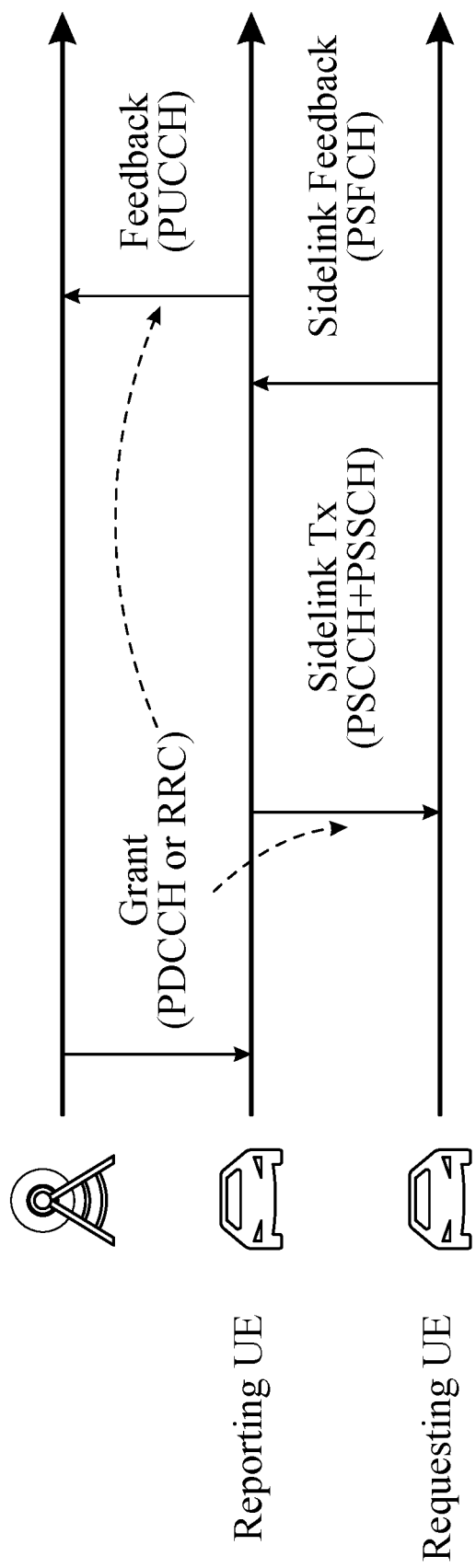
FIG. 9 illustrates two UEs in sidelink communication and in communication with a network entity, in accordance with certain aspects of the present disclosure.

Turning to FIG. 9, two UEs in sidelink communication are shown: the reporting UE may send PSCCH and PSSCH to the requesting UE. The requesting UE responds by sending sidelink feedback PSFCH to the reporting UE. In Mode 1 communication, the network entity sends PDCCH or RRC to the reporting UE, which may send PUCCH as feedback. In aspects, the reporting UE sends both the requesting UE and the network entity a respective CSI report based on the sidelink CSI RS.

Figure 10:
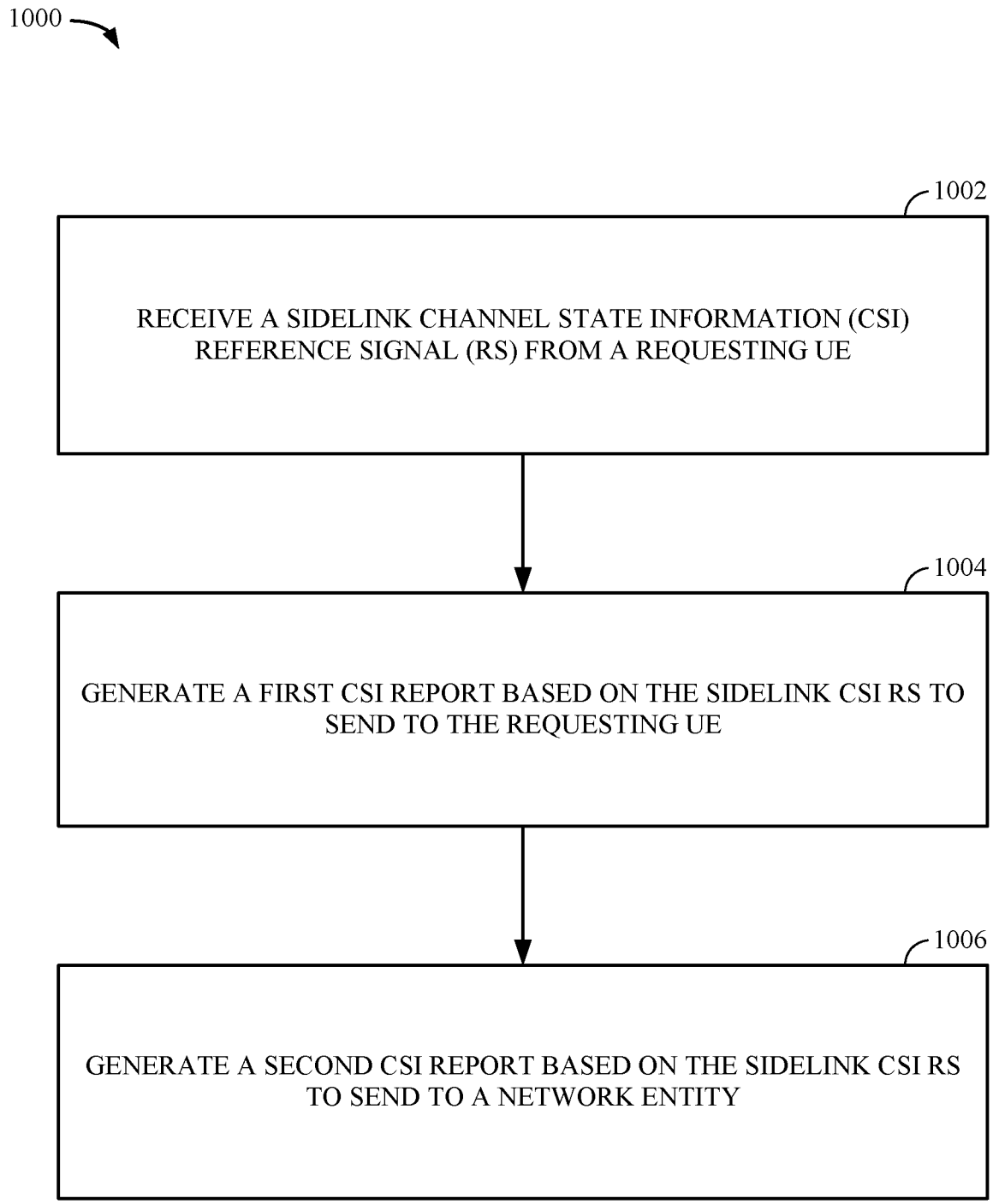
FIG. 10 illustrates example operations for wireless communications by a reporting UE, in accordance with certain aspects of the present disclosure.

FIG. 10 illustrates example operations 1000 for wireless communications by a reporting UE, in accordance with certain aspects of the present disclosure. For example, operations 1000 may be performed by a UE 120 of FIG. 1 or FIG. 4 when performing sidelink communications with another UE (e.g., a requesting UE).

Operations 1000 begin, at 1002, by receiving a sidelink channel state information (CSI) reference signal (RS) from a requesting UE. At 1004, the reporting UE generates a first CSI report based on the sidelink CSI RS to send to the requesting UE. In some aspects, the first CSI report is sent to the requesting UE via medium access control (MAC) control element (CE) in physical sidelink shared channel (PSSCH).

At 1006, the reporting UE generates a second CSI report based on the sidelink CSI RS to send to a network entity (e.g., a network entity that is in Mode 1 sidelink communication with the reporting UE). In some aspects, the second CSI report is sent to the network entity via physical uplink control channel (PUCCH) or physical uplink shared channel (PUSCH).

Figure 11:
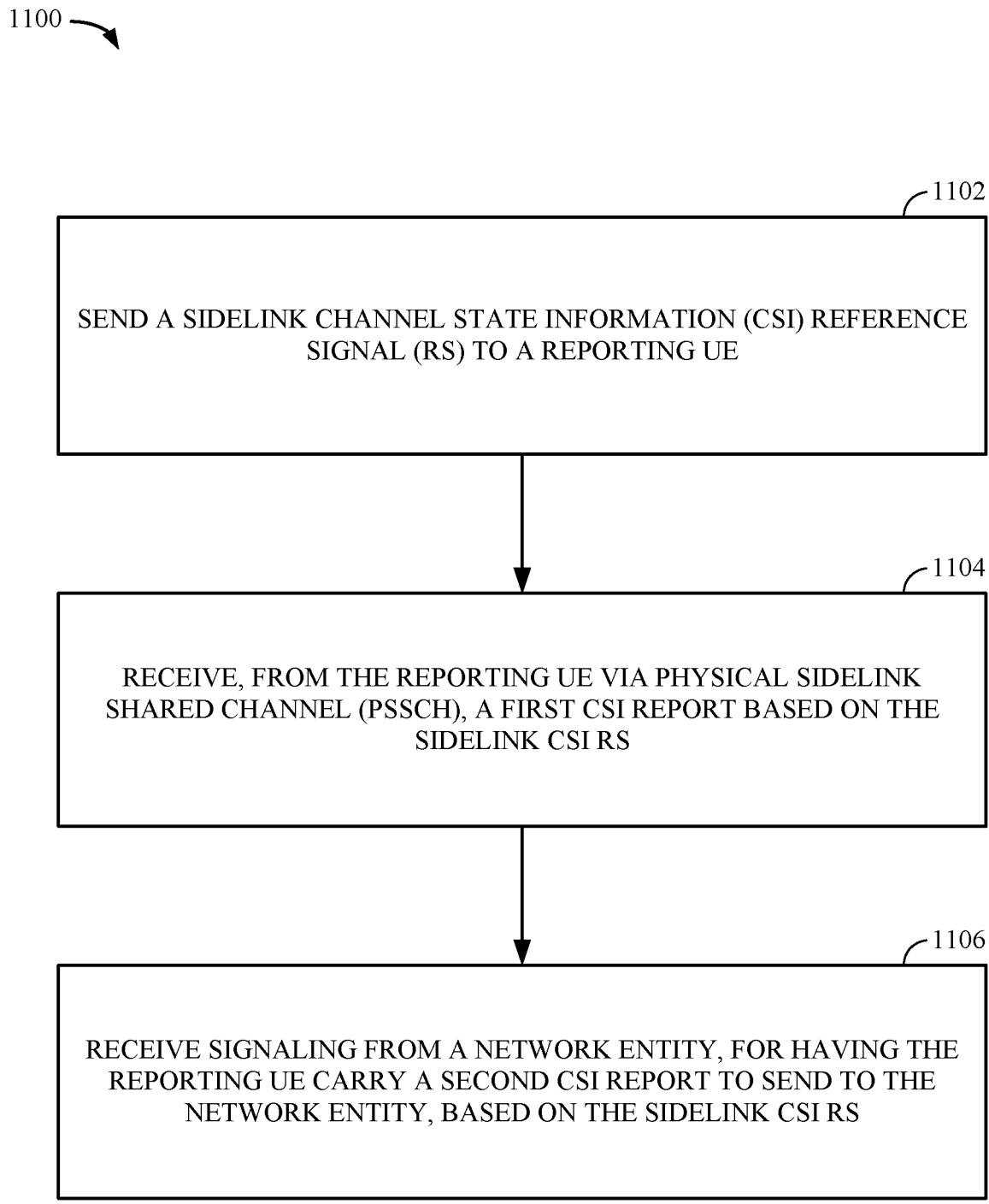
FIG. 11 illustrates example operations for wireless communications by a requesting UE, in accordance with certain aspects of the present disclosure.

FIG. 11 illustrates example operations 1100 for wireless communications by a requesting UE, in accordance with certain aspects of the present disclosure. For example, operations 1100 may be performed by a UE 120 of FIG. 1 or FIG. 4 when performing sidelink communications with another UE (e.g., a reporting UE).

Operations 1100 begin, at 1102, by sending a sidelink channel state information (CSI) reference signal (RS) to a reporting UE. At 1104, the requesting UE receives, from the reporting UE via physical sidelink shared channel (PSSCH), a first CSI report based on the sidelink CSI RS. At 1106, the requesting UE receives signaling from a network entity (e.g., a network entity that is in Mode 1 sidelink communication with the reporting UE), for having the reporting UE carry a second CSI report to send to the network entity, based on the sidelink CSI RS.

Figure 12:
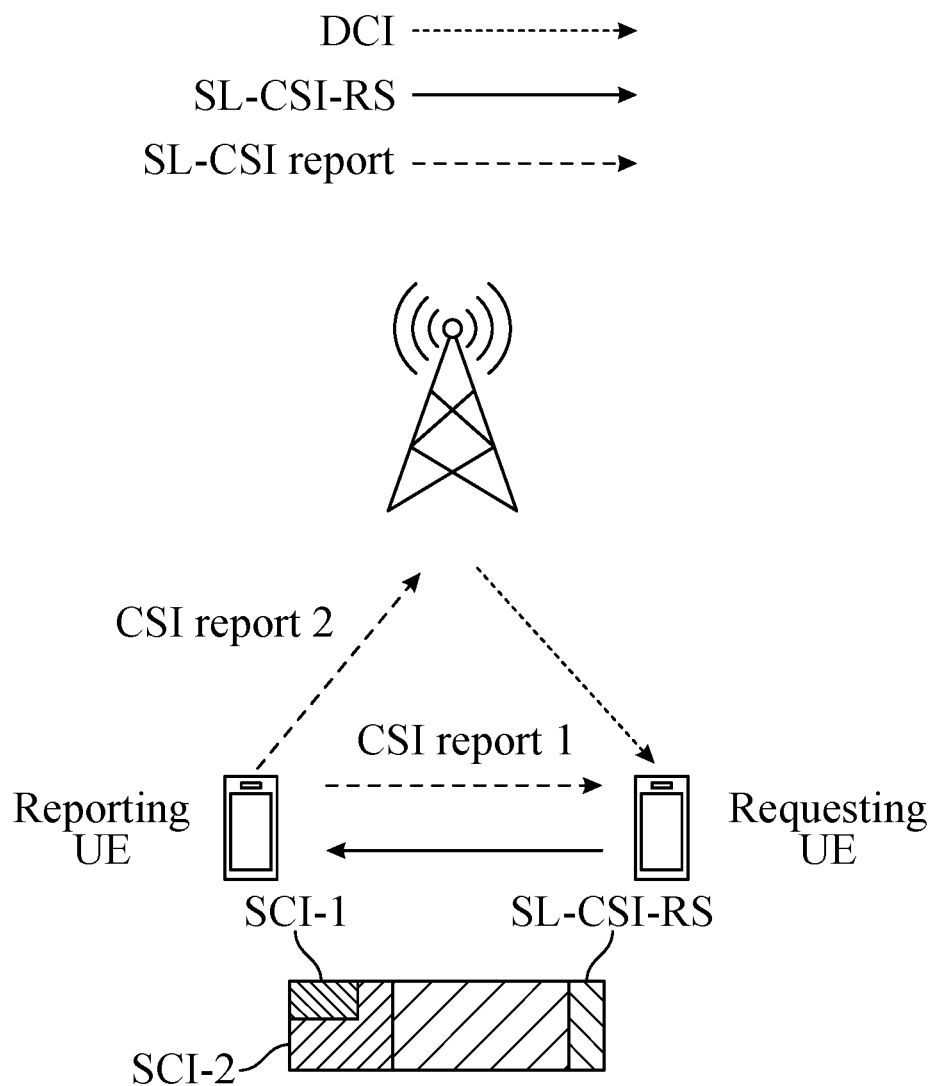
FIG. 12 illustrates example communication of a reporting UE sending two CSI reports to a requesting UE and a network entity, in accordance with certain aspects of the present disclosure.

For example, as shown in FIG. 12, the requesting UE may send SL-CSI RS to the reporting UE, and the reporting UE may send CSI report 1 to the requesting UE and CSI report 2 to the network entity. The network entity may send DCI to the requesting UE.

In some aspects, the requesting UE may receive an indication in the downlink control information (DCI) sent by the network entity to indicate a resource to carry the second CSI report from the reporting UE. The requesting UE may pass the indication signaled from the network entity to the reporting UE. For example, the resource is to indicate the PUCCH or PUSCH resource to carry the second CSI report. The PSSCH resource may be determined by the reporting UE autonomously. In some cases, the indication may be passed from the requesting UE to the reporting UE in sidelink control information (SCI) or the MAC-CE in PSSCH.

In certain aspects, the first CSI report and the second CSI report are identical; in other aspects, they are different. For example, the second CSI report may contain more channel status information than the first CSI report. The first CSI report includes channel quality indicator (CQI) and rank information, and the second CSI report includes precoding matrix indicator (PMI) in addition to the CQI and the rank information.

In some cases, the first CSI report includes a wideband CSI report, and the second CSI report includes a subband CSI report. In some cases, the first CSI report is a type 1 CSI report, and the second CSI report is a type 2 CSI report. In some cases, the first CSI report includes only CSI part 1, and the second CSI report includes both CSI part 1 and CSI part 2.

In certain aspects, the first CSI report and the second CSI report both include precoding matrix indicator (PMI) feedback.

In certain aspects, the reporting UE may receive downlink control information (DCI) to schedule subsequent data transmissions between the requesting UE and the reporting UE in sidelink connections. The DCI may include a precoding matrix indicator (PMI) for the data transmissions and further indicate precoding demodulation reference signal (DMRS) and physical sidelink shared channel (PSSCH) using the PMI. In some cases, when a PMI is not included in a DCI used to signal the requesting UE, the requesting UE may determine at least one precoder for precoding DMRS and PSSCH based on the PMI feedback and information in the first CSI report or the second CSI report.

Figure 13:
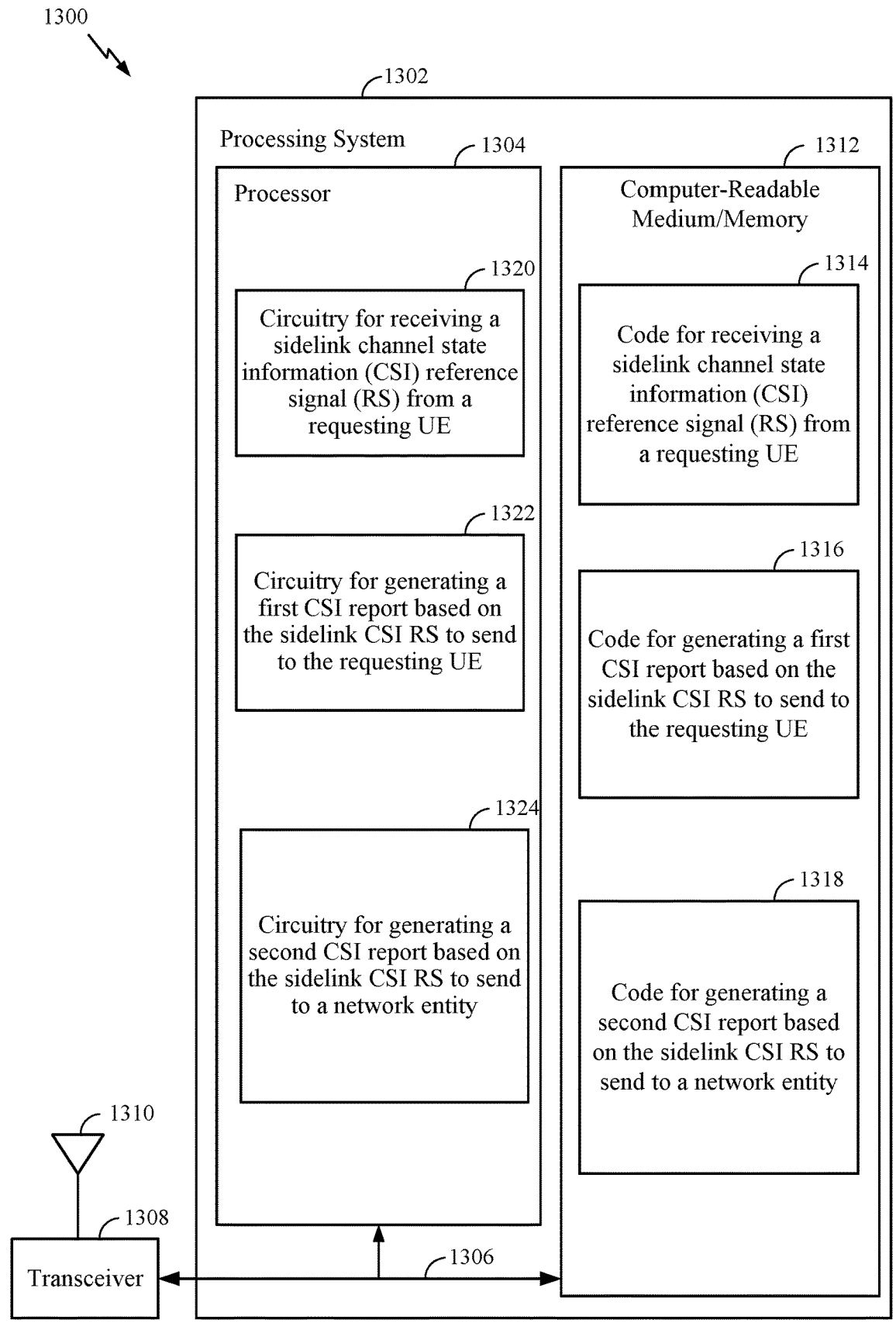
FIG. 13 illustrates a communications device that may include various components configured to perform the operations illustrated in FIG. 10, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for recovering a sidelink communication that is missed by a wireless node due to the wireless node transmitting while the sidelink communication is occurring. In certain aspects, computer-readable medium/memory 1312 stores code 1314 for receiving a sidelink channel state information (CSI) reference signal (RS) from a requesting UE; code 1316 for generating a first CSI report based on the sidelink CSI RS to send to the requesting UE; and code 1318 for generating a second CSI report based on the sidelink CSI RS to send to a network entity. In certain aspects, the processor 1304 has circuitry configured to implement the code stored in the computer-readable medium/memory 1312. The processor 1304 includes circuitry 1320 for receiving a sidelink channel state information (CSI) reference signal (RS) from a requesting UE; circuitry 1322 for generating a first CSI report based on the sidelink CSI RS to send to the requesting UE; and circuitry 1324 for generating a second CSI report based on the sidelink CSI RS to send to a network entity.

Figure 14:
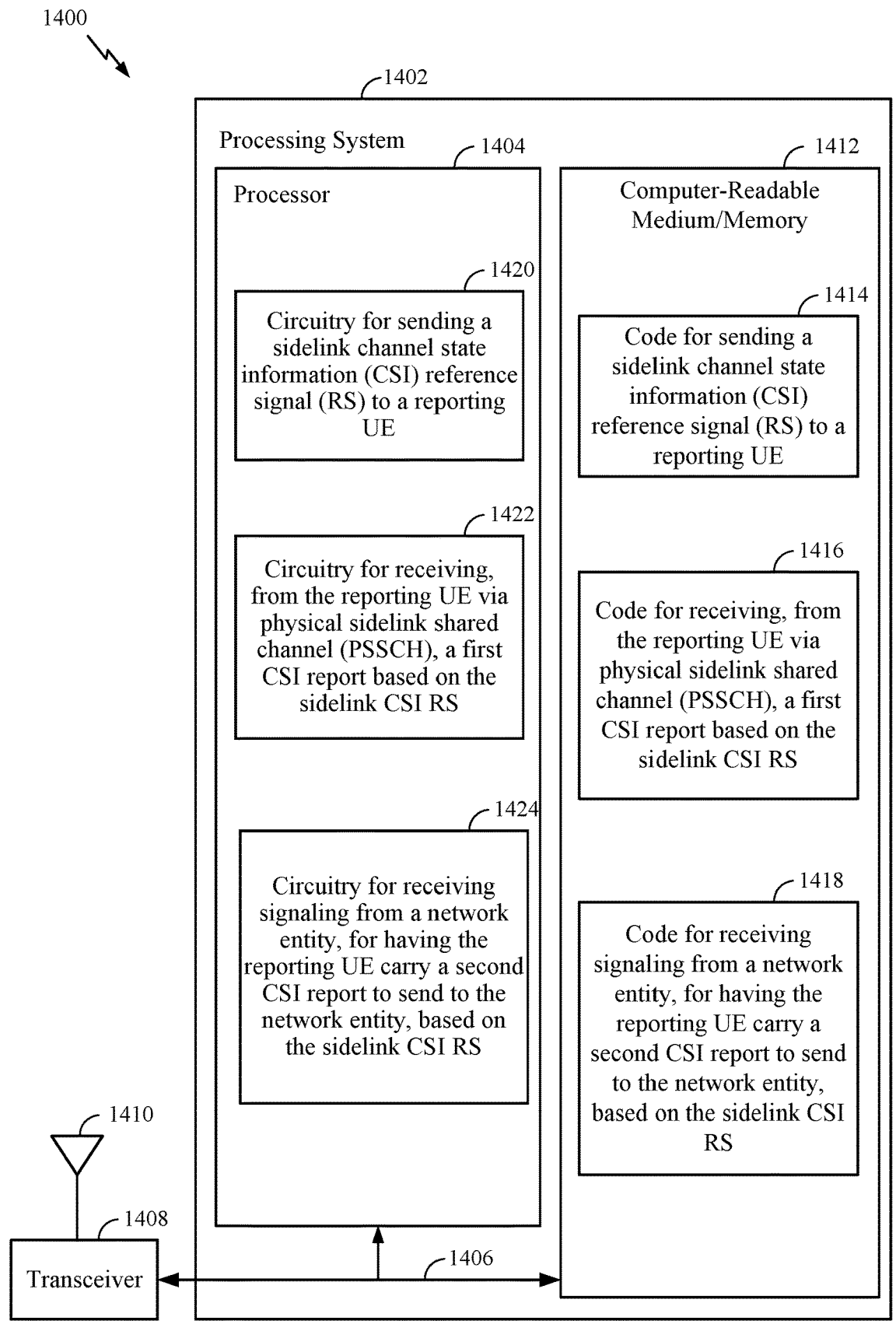
FIG. 14 illustrates a communications device that may include various components configured to perform the operations illustrated in FIG. 11, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for recovering a sidelink communication that is missed by a wireless node due to the wireless node transmitting while the sidelink communication is occurring. In certain aspects, computer-readable medium/memory 1412 stores code 1414 for sending a sidelink channel state information (CSI) reference signal (RS) to a reporting UE; code 1416 for receiving, from the reporting UE via physical sidelink shared channel (PSSCH), a first CSI report based on the sidelink CSI RS; and code 1418 for receiving signaling from a network entity, for having the reporting UE carry a second CSI report to send to the network entity, based on the sidelink CSI RS. In certain aspects, the processor 1404 has circuitry configured to implement the code stored in the computer-readable medium/memory 1412. The processor 1404 includes circuitry 1420 for sending a sidelink channel state information (CSI) reference signal (RS) to a reporting UE; circuitry 1422 for receiving, from the reporting UE via physical sidelink shared channel (PSSCH), a first CSI report based on the sidelink CSI RS; and circuitry 1424 for receiving signaling from a network entity, for having the reporting UE carry a second CSI report to send to the network entity, based on the sidelink CSI RS.

Example Aspects

Aspect 1: A method for wireless communication by a reporting user equipment (UE), comprising: receiving a sidelink channel state information (CSI) reference signal (RS) from a requesting UE; generating a first CSI report based on the sidelink CSI RS to send to the requesting UE; and generating a second CSI report based on the sidelink CSI RS to send to a network entity.

Aspect 2: The method of Aspect 1, wherein the first CSI report is sent to the requesting UE via medium access control (MAC) control element (CE) in physical sidelink shared channel (PSSCH).

Aspect 3: The method of Aspect 1 or 2, wherein the second CSI report is sent to the network entity via physical uplink control channel (PUCCH) or physical uplink shared channel (PUSCH).

Aspect 4: The method of Aspect 3, further comprising receiving an indication in the downlink control information (DCI) sent by the network entity to indicate a resource to carry the second CSI report from the requesting UE, the requesting UE passing the indication signaled from the network entity to the reporting UE.

Aspect 5: The method of Aspect 4, wherein the indication is passed from the requesting UE to the reporting UE in sidelink control information (SCI) or a medium access control (MAC) control element (CE) in physical sidelink shared channel (PSSCH).

Aspect 6: The method of any one of Aspects 1 to 5, wherein the first CSI report and the second CSI report are identical.

Aspect 7: The method of any one of Aspects 1 to 6, wherein the first CSI report and the second CSI report are different.

Aspect 8: The method of Aspect 7, wherein the second CSI report contains more channel status information than the first CSI report.

Aspect 9: The method of Aspect 8, wherein the first CSI report includes channel quality indicator (CQI) and rank information, and the second CSI report includes precoding matrix indicator (PMI) in addition to the CQI and the rank information.

Aspect 10: The method of Aspect 8, wherein the first CSI report includes a wideband CSI report, and the second CSI report includes a subband CSI report.

Aspect 11: The method of Aspect 8, wherein the first CSI report is a type 1 CSI report, and the second CSI report is a type 2 CSI report.

Aspect 12: The method of Aspect 8, wherein the first CSI report includes only CSI part 1, and the second CSI report includes both CSI part 1 and CSI part 2.

Aspect 13: The method of any one of Aspects 1 to 12, wherein the first CSI report and the second CSI report both include precoding matrix indicator (PMI) feedback.

Aspect 14: The method of Aspect 13, further comprising, when a PMI is not included in a DCI used to signal the requesting UE, determining at least one precoder for precoding DMRS and PSSCH based on the PMI feedback and information in the first CSI report or the second CSI report.

Aspect 15: The method of any one of Aspects 1 to 14, further comprising receiving a downlink control information (DCI) from the network entity to schedule data transmissions between the requesting UE and the reporting UE, wherein the DCI includes a precoding matrix indicator (PMI) for the data transmissions and further comprising: precoding demodulation reference signal (DMRS) and physical sidelink shared channel (PSSCH) using the PMI.

Aspect 16: A method for wireless communication by a requesting UE, comprising: sending a sidelink channel state information (CSI) reference signal (RS) to a reporting UE; receiving, from the reporting UE via physical sidelink shared channel (PSSCH), a first CSI report based on the sidelink CSI RS; and receiving signaling from a network entity, for having the reporting UE carry a second CSI report to send to the network entity, based on the sidelink CSI RS.

Aspect 17: The method of Aspect 16, wherein the signaling from the network entity includes a downlink control information (DCI) indicating resource to carry the second CSI report, the indication passed from the requesting UE to the reporting UE.

Aspect 18: The method of Aspect 16 or 17, wherein the indication is in sidelink control information (SCI) or in media access control (MAC) control element (CE) of the PSSCH from the requesting UE to the reporting UE.

Aspect 19: The method of any one of Aspects 16 to 18, further comprising, when a precoding matrix indicator (PMI) is included in a downlink control information (DCI) to schedule data transmissions between the requesting UE and the reporting UE, precoding demodulation reference signal (DMRS) and physical sidelink shared channel (PSSCH) using the PMI for the data transmissions.

Aspect 20: The method of Aspect 19, further comprising, when a precoding matrix indicator (PMI) is not included in the DCI, determining at least one precoder for precoding DMRS and PSSCH based on the PMI and information in the first CSI report or the second CSI report.

Aspect 21: The method of any one of Aspects 16 to 20, wherein the first CSI report and the second CSI report are identical.

Aspect 22: The method of any one of Aspects 16 to 21, wherein the first CSI report and the second CSI report are different.

Aspect 23: The method of Aspect 22, wherein the second CSI report contains more channel status information than the first CSI report.

Aspect 24: The method of Aspect 23, wherein the first CSI report includes channel quality indicator (CQI) and rank information, and the second CSI report includes precoding matrix indicator (PMI) in addition to the CQI and the rank information.

Aspect 25: The method of Aspect 23, wherein the first CSI report includes a wideband CSI report, and the second CSI report includes a subband CSI report.

Aspect 26: The method of Aspect 23, wherein the first CSI report is a type 1 CSI report, and the second CSI report is a type 2 CSI report.

Aspect 27: The method of Aspect 23, wherein the first CSI report includes only CSI part 1, and the second CSI report includes both CSI part 1 and CSI part 2.

Aspect 28: The method of any one of Aspects 16 to 27, wherein the first CSI report and the second CSI report both include precoding matrix indicator (PMI) feedback.

Aspect 29: An apparatus for wireless communication by a reporting user equipment (UE), comprising: means for receiving a sidelink channel state information (CSI) reference signal (RS) from a requesting UE; means for generating a first CSI report based on the sidelink CSI RS to send to the requesting UE; and means for generating a second CSI report based on the sidelink CSI RS to send to a network entity.

Aspect 30: An apparatus for wireless communication by a requesting UE, comprising: means for sending a sidelink channel state information (CSI) reference signal (RS) to a reporting UE; means for receiving, from the reporting UE via physical sidelink shared channel (PSSCH), a first CSI report based on the sidelink CSI RS; and means for receiving signaling from a network entity, for having the reporting UE carry a second CSI report to send to the network entity, based on the sidelink CSI RS.

Aspect 31: An apparatus for wireless communication by a reporting user equipment (UE), comprising: at least one processor and a memory configured to: receive a sidelink channel state information (CSI) reference signal (RS) from a requesting UE; generate a first CSI report based on the sidelink CSI RS to send to the requesting UE; and generate a second CSI report based on the sidelink CSI RS to send to a network entity.

Aspect 32: An apparatus for wireless communication by a requesting user equipment (UE), comprising: at least one processor and a memory configured to: send a sidelink channel state information (CSI) reference signal (RS) to a reporting UE; receive, from the reporting UE via physical sidelink shared channel (PSSCH), a first CSI report based on the sidelink CSI RS; and receive signaling from a network entity, for having the reporting UE carry a second CSI report to send to the network entity, based on the sidelink CSI RS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 11 may be performed by various processors shown in FIG. 4, such as processors 466, 458, 464, and/or controller/processor 480 of the UE 120a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a reporting user equipment (UE), comprising:
   receiving a sidelink channel state information (CSI) reference signal (RS) from a requesting UE;
   generating a first CSI report based on the sidelink CSI RS to send to the requesting UE;
   generating a second CSI report based on the sidelink CSI RS to send to a network entity;
   sending the second CSI report to the network entity via physical uplink control channel (PUCCH) or physical uplink shared channel (PUSCH); and
   receiving an indication in a downlink control information (DCI) sent by the network entity to indicate a resource to carry the second CSI report from the requesting UE, the requesting UE passing the indication signaled from the network entity to the reporting UE.

2. The method of claim 1, wherein the first CSI report is sent to the requesting UE via medium access control (MAC) control element (CE) in physical sidelink shared channel (PSSCH).

3. The method of claim 1, wherein the indication is passed from the requesting UE to the reporting UE in sidelink control information (SCI) or a medium access control (MAC) control element (CE) in physical sidelink shared channel (PSSCH).

4. The method of claim 1, wherein the first CSI report and the second CSI report are identical.

5. A method for wireless communication by a reporting user equipment (UE), comprising:
   receiving a sidelink channel state information (CSI) reference signal (RS) from a requesting UE;
   generating a first CSI report based on the sidelink CSI RS to send to the requesting UE; and
   generating a second CSI report based on the sidelink CSI RS to send to a network entity;
   wherein the first CSI report and the second CSI report are different.

6. The method of claim 5, wherein the second CSI report contains more channel status information than the first CSI report.

7. The method of claim 6, wherein the first CSI report includes channel quality indicator (CQI) and rank information, and the second CSI report includes precoding matrix indicator (PMI) in addition to the CQI and the rank information.

8. The method of claim 6, wherein the first CSI report includes a wideband CSI report, and the second CSI report includes a subband CSI report.

9. The method of claim 6, wherein the first CSI report is a type 1 CSI report, and the second CSI report is a type 2 CSI report.

10. The method of claim 6, wherein the first CSI report includes only CSI part 1, and the second CSI report includes both CSI part 1 and CSI part 2.

11. A method for wireless communication by a reporting user equipment (UE), comprising:
    receiving a sidelink channel state information (CSI) reference signal (RS) from a requesting UE;
    generating a first CSI report based on the sidelink CSI RS to send to the requesting UE; and
    generating a second CSI report based on the sidelink CSI RS to send to a network entity;
    wherein the first CSI report and the second CSI report both include precoding matrix indicator (PMI) feedback.

12. The method of claim 11, further comprising, when a PMI is not included in a DCI used to signal the requesting UE, determining at least one precoder for precoding DMRS and PSSCH based on the PMI feedback and information in the first CSI report or the second CSI report.

13. A method for wireless communication by a reporting user equipment (UE), comprising:
    receiving a sidelink channel state information (CSI) reference signal (RS) from a requesting UE;
    generating a first CSI report based on the sidelink CSI RS to send to the requesting UE;
    generating a second CSI report based on the sidelink CSI RS to send to a network entity; and
    receiving a downlink control information (DCI) from the network entity to schedule data transmissions between the requesting UE and the reporting UE, wherein the DCI includes a precoding matrix indicator (PMI) for the data transmissions and further comprising: precoding demodulation reference signal (DMRS) and physical sidelink shared channel (PSSCH) using the PMI.

14. A method for wireless communication by a requesting UE, comprising:
    sending a sidelink channel state information (CSI) reference signal (RS) to a reporting UE;
    receiving, from the reporting UE via physical sidelink shared channel (PSSCH), a first CSI report based on the sidelink CSI RS; and
    receiving signaling from a network entity, for having the reporting UE carry a second CSI report to send to the network entity, based on the sidelink CSI RS;
    wherein the signaling from the network entity includes a downlink control information (DCI) indicating resource to carry the second CSI report, the indication passed from the requesting UE to the reporting UE.

15. The method of claim 14, wherein the indication is in sidelink control information (SCI) or in media access control (MAC) control element (CE) of the PSSCH from the requesting UE to the reporting UE.

16. The method of claim 14, further comprising, when a precoding matrix indicator (PMI) is included in a downlink control information (DCI) to schedule data transmissions between the requesting UE and the reporting UE, precoding demodulation reference signal (DMRS) and physical sidelink shared channel (PSSCH) using the PMI for the data transmissions.

17. The method of claim 16, further comprising, when a precoding matrix indicator (PMI) is not included in the DCI, determining at least one precoder for precoding DMRS and PSSCH based on the PMI and information in the first CSI report or the second CSI report.

18. The method of claim 14, wherein the first CSI report and the second CSI report are identical.

19. The method of claim 14, wherein the first CSI report and the second CSI report are different.

20. The method of claim 19, wherein the second CSI report contains more channel status information than the first CSI report.

21. The method of claim 20, wherein the first CSI report includes channel quality indicator (CQI) and rank information, and the second CSI report includes precoding matrix indicator (PMI) in addition to the CQI and the rank information.

22. The method of claim 20, wherein the first CSI report includes a wideband CSI report, and the second CSI report includes a subband CSI report.

23. The method of claim 20, wherein the first CSI report is a type 1 CSI report, and the second CSI report is a type 2 CSI report.

24. The method of claim 20, wherein the first CSI report includes only CSI part 1, and the second CSI report includes both CSI part 1 and CSI part 2.

25. The method of claim 14, wherein the first CSI report and the second CSI report both include precoding matrix indicator (PMI) feedback.

26. An apparatus for wireless communication by a reporting user equipment (UE), comprising:
- at least one processor and a memory configured to:
  - receive a sidelink channel state information (CSI) reference signal (RS) from a requesting UE;
  - generate a first CSI report based on the sidelink CSI RS to send to the requesting UE;
  - generate a second CSI report based on the sidelink CSI RS to send to a network entity;
- sending the second CSI report to the network entity via physical uplink control channel (PUCCH) or physical uplink shared channel (PUSCH); and
- receiving an indication in a downlink control information (DCI) sent by the network entity to indicate a resource to carry the second CSI report from the requesting UE, the requesting UE passing the indication signaled from the network entity to the reporting UE.

27. An apparatus for wireless communication by a requesting user equipment (UE), comprising:
- at least one processor and a memory configured to:
  - send a sidelink channel state information (CSI) reference signal (RS) to a reporting UE;
  - receive, from the reporting UE via physical sidelink shared channel (PSSCH), a first CSI report based on the sidelink CSI RS; and
  - receive signaling from a network entity, for having the reporting UE carry a second CSI report to send to the network entity, based on the sidelink CSI RS;
- wherein the signaling from the network entity includes a downlink control information (DCI) indicating resource to carry the second CSI report, the indication passed from the requesting UE to the reporting UE.

* * * * *